(12) United States Patent
Jacob et al.

(10) Patent No.: US 10,062,128 B2
(45) Date of Patent: Aug. 28, 2018

(54) ACCESSING DATA FROM MULTIPLE DISPARATE SYSTEMS THROUGH A GRAPH

(71) Applicant: HomeAway.com, Inc., Austin, TX (US)

(72) Inventors: Bryon Kristen Jacob, Austin, TX (US); Ronald William Corbett, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 120 days.

(21) Appl. No.: 15/043,449

(22) Filed: Feb. 12, 2016

(65) Prior Publication Data

US 2017/0236225 A1 Aug. 17, 2017

(51) Int. Cl.
*G06F 3/00* (2006.01)
*G06Q 50/16* (2012.01)
*G06F 9/54* (2006.01)

(52) U.S. Cl.
CPC .............. *G06Q 50/16* (2013.01); *G06F 9/54* (2013.01)

(58) Field of Classification Search
CPC ....................................................... G06F 9/54
USPC ........................................................ 719/310
See application file for complete search history.

(56) References Cited

U.S. PATENT DOCUMENTS

| 2006/0075114 A1* | 4/2006 | Panasyuk | H04L 67/28 709/227 |
| 2016/0088108 A1* | 3/2016 | Felts | H04L 67/1021 709/223 |
| 2016/0112503 A1* | 4/2016 | Yang | H04L 12/6418 709/223 |

OTHER PUBLICATIONS

Adrienne Felt, Privacy Protection for Social Networking Platforms, May 2008.*

* cited by examiner

*Primary Examiner* — Lechi Truong
(74) *Attorney, Agent, or Firm* — Knobbe, Martens, Olsen & Bear, LLP

(57) ABSTRACT

Various embodiments relate generally to a system, a device and a method provide for accessing data across multiple disparate systems via a graph data structure. A request associated with a data object in a listing management system may be received. An identifier associated with the data object may then be determined. One or more nodes in a knowledge graph may then be traversed responsive to the identifier and the request associated with the data object. Data items are retrieved from the one or more nodes in the knowledge graph based on the request. Responsive to the received request, a proxy object comprising the retrieved one or more data items is then provided.

19 Claims, 7 Drawing Sheets

ACCESSING DATA FROM MULTIPLE DISPARATE SYSTEMS THROUGH A GRAPH

FIELD

Various embodiments relate generally to electrical and electronic hardware, computer software, wired and wireless network communications, and distributed software applications for content delivery. More specifically, a system and a method provide for accessing data across multiple disparate systems via a graph data structure.

BACKGROUND

Conventional techniques for content delivery have evolved away from mere pen-and-paper implementations as the complexity increases have increasingly relied on technological solutions. With the advent of computing devices, massive amounts of data representing content items are stored in multiple and disparate systems. Accessing, retrieving, and analyzing this data across these different systems remains a challenge.

For example, some conventional approaches may require a separate path for each access and retrieval of data from each system. Maintaining an open connection for each system may require a complex management system. Additionally, these conventional approaches do not show the relationships between the data maintained in separate systems.

While conventional approaches are functional, the usual structures and/or functionalities for accessing data from multiple disparate systems are not suited to the increasing technological demands required to analyze the data.

Thus, what is needed is a solution for effectively accessing multiple disparate systems without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
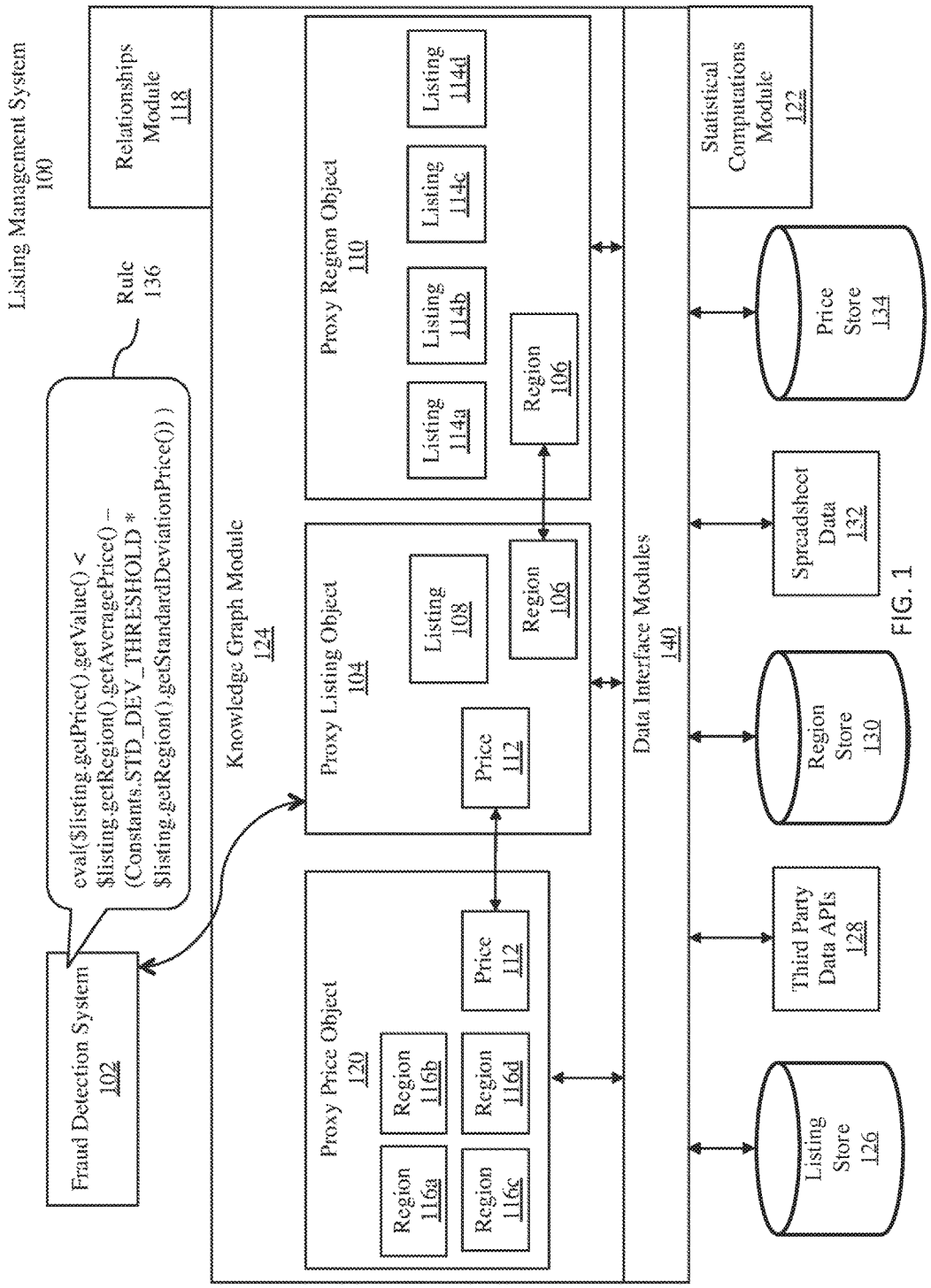
FIG. 1 is a high-level block diagram depicting a process of accessing multiple disparate systems in a listing management system, according to an embodiment.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Traveling around the world has never been easier in the Internet age. People wishing to travel less expensively, with family, or luxuriously may search various websites for the best deals and/or best amenities for hotels, vacation homes, and short-term rentals. With the advent of on-demand housing software applications, owners and travellers may interact with property listings on various websites, mobile applications, and application services. For example, a homeowner may list their property on an on-demand housing software application with an availability, rental cost, description of the property, and photos with accompanying captions describing the property. Travellers may browse through the various property listings, bookmark or indicate interest in a particular listing, and submit reviews for property listings via the on-demand housing software application provided through a mobile application operating on a mobile device or a website running on a web browser accessed through the Internet.

Users may also view content provided by administrators of the on-demand housing software application through various methods, such as viewing web pages of hosted websites by the on-demand housing software application, downloading application onto mobile devices provided by the on-demand housing software application, and viewing content pushed to the applications, for example. The on-demand housing software application may further deliver content on-demand, such as photos of property listings, streamed in high-resolution and/or high-definition, for example. Content files, such as photos, video, audio, and so forth, may be stored on a secured system, but exposed to Internet users, for example.

Listings may include several components that are aggregated and stored in separate data sources, such as price, description, and region. For example, a database may store all listings in a certain geographic region, such as Miami, Fla. A separate data file may include recently updated study of multiple regions that have similar price points. A further data source may include recently received listings from users of a listing management system. In one embodiment, an application programming interface (API) may be used to access third-party data sources, such as maps, restaurant guides, and nearby attractions. Managing access to these multiple systems as well as the relationships between these systems adds code complexity and difficulty. In some examples, an abstraction layer may be used to address these issues.

FIG. 1 is a high-level block diagram depicting a process of accessing multiple disparate systems in a listing management system 100, according to an embodiment. The listing management system 100 may include a fraud detection system 102, for example, that is used to detect fraudulent behavior by users of the listing management system 100. The fraud detection system 102 may request various data items from disparate data sources through a knowledge graph module 124. A knowledge graph module 124 may generate a proxy listing object 104, for example, based on a request from the fraud detection system 102. The proxy listing object 104 is an example output of the system 100 and the request from the fraud detection system 102 is an example input to the system 100 through the knowledge graph module 124. A proxy listing object 104 may include several data components, including a listing 108, a price 112, and a region 106. Each data component may be linked, or related, to other data components of other proxy objects generated by the knowledge graph module 124. In one embodiment, each data component may be an instance of a method or class of one or more data interface modules 140, providing an abstraction layer to access and retrieve data items from across multiple disparate data sources. The data interface modules 140 may individually access a particular data source, such as a listing store 126, third party data APIs 128, a region store 130, spreadsheet data 132, and a price store 134. Based on the returned proxy listing object 104, the fraud detection system 102 is provided with access to data included in the proxy listing object 104 in addition to other related objects, such as a proxy price object 120 and a proxy region object 110, without having to access a database. By reducing direct database hits, knowledge graph module 124 increases performance while reducing code complexity.

FIG. 1 and the other figures use like reference numerals to identify like elements. For example, a letter after a reference numeral, such as "114a," indicates that the text refers specifically to the element having that particular reference numeral. A reference numeral in the text without a following letter, such as "114," refers to one or more of the elements in the figures bearing that reference numeral (e.g., "114" in the text refers to reference numerals "114a," "114b," "114c," and/or "114d" in the figures). While four listing components 114 are illustrated in a proxy region object 110 in FIG. 1 to simplify and clarify the description, any number of listing components may be implemented.

Returning to the example above, a fraud detection system 102 may request one or more data items from the knowledge graph module 124 through a proxy listing object 104. The proxy listing object 104 may be requested based on the fraud detection system 102 requesting the listing object with a specific identifier (ID). A fraud detection system 102 may include a rules engine (not illustrated) that evaluates fraud rules. As illustrated in FIG. 1, a rule 136 may include an instruction that calls various methods and/or classes of a proxy listing object 104. For example, a code snippet that reads "$listing.getPrice( ).getValue( )" may call a "getPrice( )" method of the proxy listing object 104. Here, the price 112 of the proxy listing object 104 may be stored in a separate database from a listing store 126, such as a price store 134. Note that the depicted code snippet is merely an example of any type of instruction in any type of programming language with which rule 136 is associated, and further is non-limiting.

In one embodiment, the proxy listing object 104 returned by the knowledge graph module 124 may be a JAVA proxy object that includes properties directly associated with the object, including a title, description, brand, units, and so forth, as well as methods that may be invoked in order to retrieve related objects. In the case of a proxy listing object 104, related objects may include a region 106 (e.g., "getRegion( )") and a price 112 (e.g., "getPrice( )").

In order to construct the proxy listing object 104 that is returned to the rules engine of the fraud detection system 102, the knowledge graph module 124 may contact multiple data sources to construct that object. All data sources are hidden (e.g., undetectable) from clients of the knowledge graph module 124. One or more data interface modules 140 may be used to contact the multiple data sources used to construct the requested object. For example, a data interface module 140 may be used to retrieve properties for a listing, such as a property identifier, a brand identifier, and a list of units associated with the listing. An extended interface may be another data interface module 140 that may be used to identify relationships between the requested listing object and other objects, such as the price 112 and region 106.

In one embodiment, the knowledge graph module 124 includes one or more components that may constitute or facilitate an abstraction layer, whereby the abstraction layer may use, for example, annotations, SPRING JAVA configurations, and JAVA proxies to provide a uniform data abstraction layer to multiple disparate data sources so that fraud rules can access data and relationships between data across those data sources without knowledge of their origin, system boundaries, or how data from those systems are related to each other behind the abstraction layer. In some examples, structures and/or functionalities of SPRING JAVA may be described in SPRING Projects reference documentation maintained by Pivotal Software, Inc. For example, SPRING JAVA configurations may provide a JAVA approach to configuration of SPRING versus a more well-known XML approach. Based on the SPRING JAVA configurations, an object-oriented approach to generating code snippets, input to the abstraction layer described herein, may be used to access data items stored in the data sources behind the abstraction layer. Similarly, annotations and JAVA proxies may also be used in generating various code snippets that enable various internal systems and modules to access data items stored behind the abstraction layer provided by the knowledge graph module 124, in an embodiment. As illustrated in FIG. 1, data interface module 140 provides at least a portion of the abstraction layer that enables data from a listing store 126, third party data APIs 128 (as well as other APIs), a region store 130, spreadsheet data 132 (including flat text files, EXCEL spreadsheets, and/or XML files), and a price store 134 to be accessed and retrieved to construct a proxy price object 120, a proxy region object 110, and/or a proxy listing object 104.

A knowledge graph module 124 may also use a relationships module 118 to identify and provide relationships between data stored in multiple disparate data sources. For example, a proxy listing object 104 may be related to a proxy price object 120 based on a price 112. The price 112 may be a key that defines how the proxy listing object 104 is related to the proxy price object 120. In an embodiment, a proxy price object 120 may include a list of regions 116 that have an average price equal to the price 112. For example, a listing may be submitted at a price of $50 per night. However, the average price for the region included in the listing may be $200 per night. A proxy price object 120 may include a list of regions 116 that may be compared to the region 106 of the proxy listing object 104 by a fraud rule, for example. If the price 112 is substantially lower than the average price for the region 106, then the listing may be fraudulent. In some examples, "substantially lower" may be defined as less than the average price for the region minus a constant threshold multiplied by a standard deviation of the region or some other pre-defined threshold. The constant threshold and/or other pre-defined threshold may be determined by administrators of the listing management system 100, in one embodiment, based on experimental testing.

A statistical computations module 122 may be used to calculate various statistics based on the data stored across multiple disparate systems. Returning to the example above, a standard deviation price may be computed based on an evaluation of a fraud rule by a fraud detection system 102. Using the proxy listing object 104 returned from the knowledge graph module 124, a code snippet such as "$listing.getRegion( ).getStandardDeviationPrice( )" may cause a processor to traverse the knowledge graph to a related object, a proxy region object 110, and invoke a method, such as the statistical computations module 122, to calculate the standard deviation of price for listings 114 included in the region 106. Similarly, a code snippet such as "$listing.getRegion( ).getAveragePrice( )" may cause a processor to traverse the knowledge graph from the proxy listing object 104 to the proxy region object 110 and use the statistical computations module 122 to return the average price for the region 106. The code snippet may represent an example input to the abstraction layer described above, and the returned computation, here the average price for the region 106, may represent an example output of the abstraction layer described above. Example inputs and outputs of the system 100 are described throughout as inputs and outputs of the various novel functions described herein.

System Architecture

Figure 2:
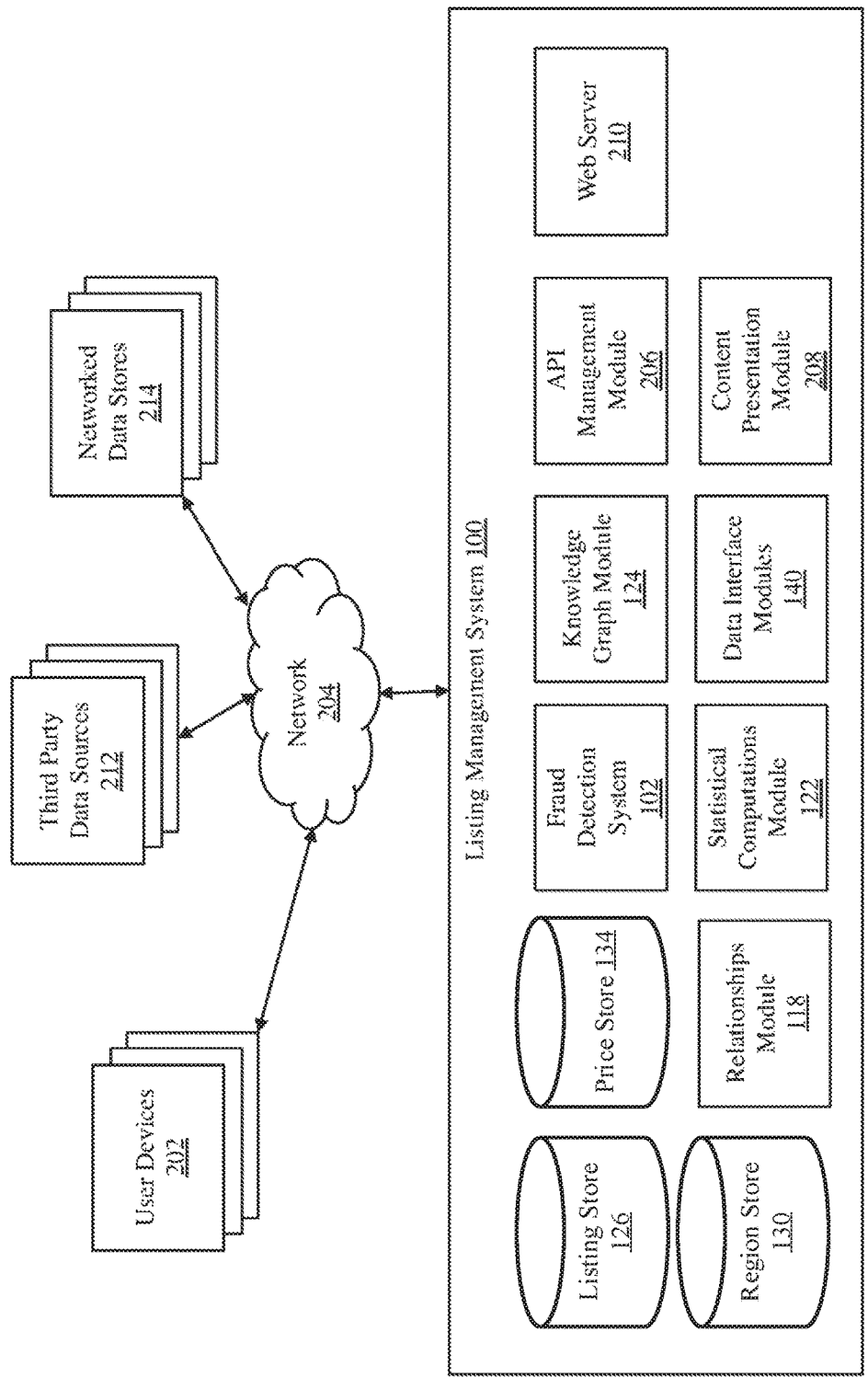
FIG. 2 is a network diagram of a system for enabling access to data stored in disparate data stores in a listing management system, showing a block diagram of the listing management system, according to an embodiment.

FIG. 2 is a network diagram of a system for enabling access to multiple disparate data sources in a listing management system, showing a block diagram of the listing management system, according to an embodiment. The system environment includes one or more user devices 202, third party data sources 212, networked data stores 214, the listing management system 100, and a network 204. In alternative configurations, different and/or additional modules can be included in the system.

The user devices 202 may include one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, wearable device, etc. The user device 202 is configured to communicate via network 204. The user device 102 or developer system 120 can execute an application, for example, a browser application that allows a user of the user device 202 to interact with the listing management system 100. In another embodiment, the user device 202 interacts with the listing management system 100 through an application programming interface (API) that runs on the native operating system of the user device 102, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the listing management 100. The listing management system 100 includes a listing store 126, a region store 130, a price store 134, a relationships module 118, a fraud detection system 102, a statistical computations module 122, a knowledge graph module 124, one or more data interface modules 140, a web server 210, an API management module 206, and a content presentation module 208. In other embodiments, the listing management system 100 may include additional, fewer, or different modules for various applications. Conventional components such as network interfaces, security functions, load balancers, failover servers, management and network operations consoles, and the like are not shown so as to not obscure the details of the system.

The web server 210 links the listing management system 100 via the network 204 to one or more user devices 202; the web server 210 serves web pages, as well as other web-related content, such as Java, Flash, XML, and so forth. The web server 210 may provide the functionality of receiving and routing messages between the listing management system 100 and the user devices 202, for example, instant messages, queued messages (e.g., email), text and SMS (short message service) messages, or messages sent using any other suitable messaging technique. The user can send a request to the web server 210 to upload information, for example, content that is stored in a listing store 126. Additionally, the web server 210 may provide API functionality to send data directly to native user device operating systems, such as iOS, ANDROID, webOS, and RIM.

A listing store 126 may store content uploaded by users of the listing management system 100. Content for a property listing may include a title of a property, text describing the property listing, photos and/or video of the property, reviews provided by travelers staying at the property listing, amenities available at the property, contact information of the owner or property manager, and so forth. Content for a traveler may include profile information about the traveler, in one embodiment. A region store 130 may include data items about regions where properties are located, such as cities, neighborhoods, metropolitan areas, states, countries, and other defined regions. Multiple regions may be associated with a listing. For example, a listing in San Francisco, Calif. may be associated with a Twin Peaks neighborhood region, a central region of San Francisco, Calif., a "popular" region for listings, a San Francisco region, a San Francisco Bay Area region, a Northern California region, a California region, a West Coast region, a USA region, and so forth. In one embodiment, a region may be defined by administrators of a listing management system 100. For example, a "wine country region" may include Napa, Sonoma, and Mendocino counties of Northern California. The region store 130 may be organized by region, in one embodiment, where each region is uniquely identified. Listings may be identified by a unique identifier and associated with a region in the region store 130.

A price store 134 may include pricing information for listings in a listing management system 100. In one embodiment, pricing information for listings may be determined by users submitting the listings on the listing management system 100. A price may be assigned a unique identifier such that similarly priced listings are associated with a price object in the price store 134. In another embodiment, pricing information may be stored in various methods, such as a flat text file, a spreadsheet, an XML file, and so forth. The price store 134 may include listing data, region data, and price data associated with listings and organized in a multitude of ways, such as by listing, by region, by price ranges, and so forth. In one embodiment, data in a price store 134 may include unstructured data.

One or more data interface modules 140 enable various internal systems and modules in the listing management system 100 to access, retrieve, and store data in the data stores described above. A data interface module 140 may include instructions and/or invoke methods to enable an internal system, such as a fraud detection system 102, to retrieve information through a proxy object. In this way, the one or more data interface modules 140 may facilitate, in part, the abstraction layer described above. For example, a data interface module 140 may be used by a proxy listing object 104 to retrieve a property identifier, a brand, and/or a list of units associated with a particular listing. The data interface module 140 may access a listing store 126 to retrieve these properties as the proxy listing object 104 is constructed by the knowledge graph module 124 based on a request by the fraud detection system 102. A data interface module 140 may also enable a "hop" (e.g., traversing) to a related node, such as a region or a price, connected to a constructed proxy listing object 104 in the knowledge graph module 124. For example, a "getRegion( )" method may be invoked from a proxy listing object 104 to access and retrieve data items associated with one or more regions associated with the listing associated with the proxy listing object 104.

A relationships module 118 may be used to identify relationships between data stored in disparate systems. As described in the previous example, a "hop" may be required to access data from a related data source, such as data items associated with the one or more regions associated with a listing associated with a proxy listing object 104. Relationships between data items may be managed and/or identified by the relationships module 118. In one embodiment, a relationships module 118 may identify a key for each data source such that relationships between multiple data sources may be identified. In another embodiment, data items stored in multiple data sources may be related based on other criteria, such as price point, regions, similar amenities, owners, travellers, and the like. In a further embodiment, a relationships module 118 uses annotations to identify relationships between multiple data sources. Custom annotations, such as JAVA annotations, may be used to generate object relational mappings between disparate data sources. As a result, the relationships module 118 may enable various modules to identify relationships between data sources through annotations. In yet another embodiment, a relationships module 118 may use SPRING JAVA configurations to similarly define relationships between disparate data sources. In one embodiment, a combination of annotations and SPRING JAVA configuration may be used to define relationships between data sources.

A statistical computations module 122 may determine one or more computations based on data items stored in disparate systems. For example, a standard deviation may be computed as a result of a method call to a constructed proxy listing object 104 that relies on data items stored in a region store 130 and a price store 134. The standard deviation method call may compute the standard deviation of the prices of listings in a particular region, in one embodiment. In other embodiments, other groupings or subsets may be requested based on the method call. Other types of determinations and techniques may be performed by the statistical computations module 122, including, but not limited to, average, mean, median, sampling, statistical models, regression models, inferential statistics, probabilistic models, and the like. The determinations and techniques performed by the statistical computations module 122 may be requested as a result of a function call to the abstraction layer by any number of systems and/or modules in the listing management system 100, such as a fraud detection system 102.

An API management module 206 may manage one or more adapters needed for the listing management system 100 to communicate with various third party systems, such as third party virtual storage systems 202 and virtual hosting web servers 210. Application programming interfaces (APIs), or adapters, may be used to push data to the external tools, websites, and user devices 102. Adapters may also be used to receive data from the external systems. In one embodiment, the API management module 206 manages the amount of connections to the external systems needed to operate efficiently.

A content presentation module 208 may provide content on a listing management system 100, including photos, videos, text, and graphics. The content presentation module 208 provides content for display within web browsers. Content may be displayed using various methods, such as JavaScript, Node.js, AJAX, and other methods of providing data via browsers. In one embodiment, the content delivered by the content presentation module 208 may be stored and retrieved from the file stores 118 through the file storage server 116. Similarly, the content presentation module 208 may provide content via an application natively operating on mobile devices, such as wearable devices and mobile phones. Mobile devices may require APIs to receive data from the listing management system 100. The content presentation module 208 may present data for display through these APIs. In one embodiment, the content delivered by content presentation module 208 may be stored and retrieved from a listing store 126, a price store 134, a region store 130, third party data sources 212, networked data stores 214, and/or other data sources accessible by the knowledge graph module 124 and the one or more data interface modules 140.

A fraud detection system 102 may include one or more internal modules of a listing management system 100 that request a proxy object from the knowledge graph module 124. In one embodiment, a fraud detection system 102 may include various fraud rules that check for various types of potential user fraud on the listing management system 100, such as posting fake listings, posting abnormally low prices for listings, posting the same properties on multiple sites operated by the listing management system 100 at different prices, and so forth. For example, fake listings may be posted by users of the listing management system 100 that list non-existent properties, properties that are not owned or managed by the posting user, and/or properties listed with amenities or other features that do not exist or are mischaracterized in some way. A fraud rule that may be implemented by the fraud detection system 102 may include various rules, which may be updated over time, that scan for various anomalies typically found in fake listings. As an example, fake listings may consistently use a same price, same images, and/or other fraudulent characteristics that may be detected through heuristic rules in the fraud detection system 102. Fake listings may also be reported by other users of the listing management system 100, and that user feedback may be retrieved through a proxy object from the knowledge graph module 124, in an embodiment.

Abnormally low prices for listings may be another type of fraud that can be detected by the fraud detection system 102. In another embodiment, a fraud detection system 102 may include several modules where each module may focus on a particular type of potential fraud based on data type. For example, a set of fraud rules may check for fraud based on abnormal deviations based on price within a region. Abnormal deviations may be defined, and refined over time, by administrators of the listing management system 100.

Similar listings posted on multiple sites operated by the listing management system 100 may also be detected by the fraud detection system 100. A set of fraud rules may check for fraud based on inferential statistical methods based on similar listings. For example, properties that are similarly described, using the same word sets, photos, and/or amenities, but having different addresses and prices may be detected through various fraud rules. A further set of fraud rules may check for fraud based on probabilistic methods using user inputted data, and so forth. For example, one or more probabilistic methods may be used to determine whether the same listing has been posted on multiple sites operated by the listing management system 100, such as the same user posting the multiple listings having the same or substantially similar description, the same or substantially similar photos, and/or amenities. Based on the probabilistic methods, the likelihood of the listings being fraudulent may vary as a function of the similarity or sameness of the multiple listings, in one embodiment.

Figure 3:
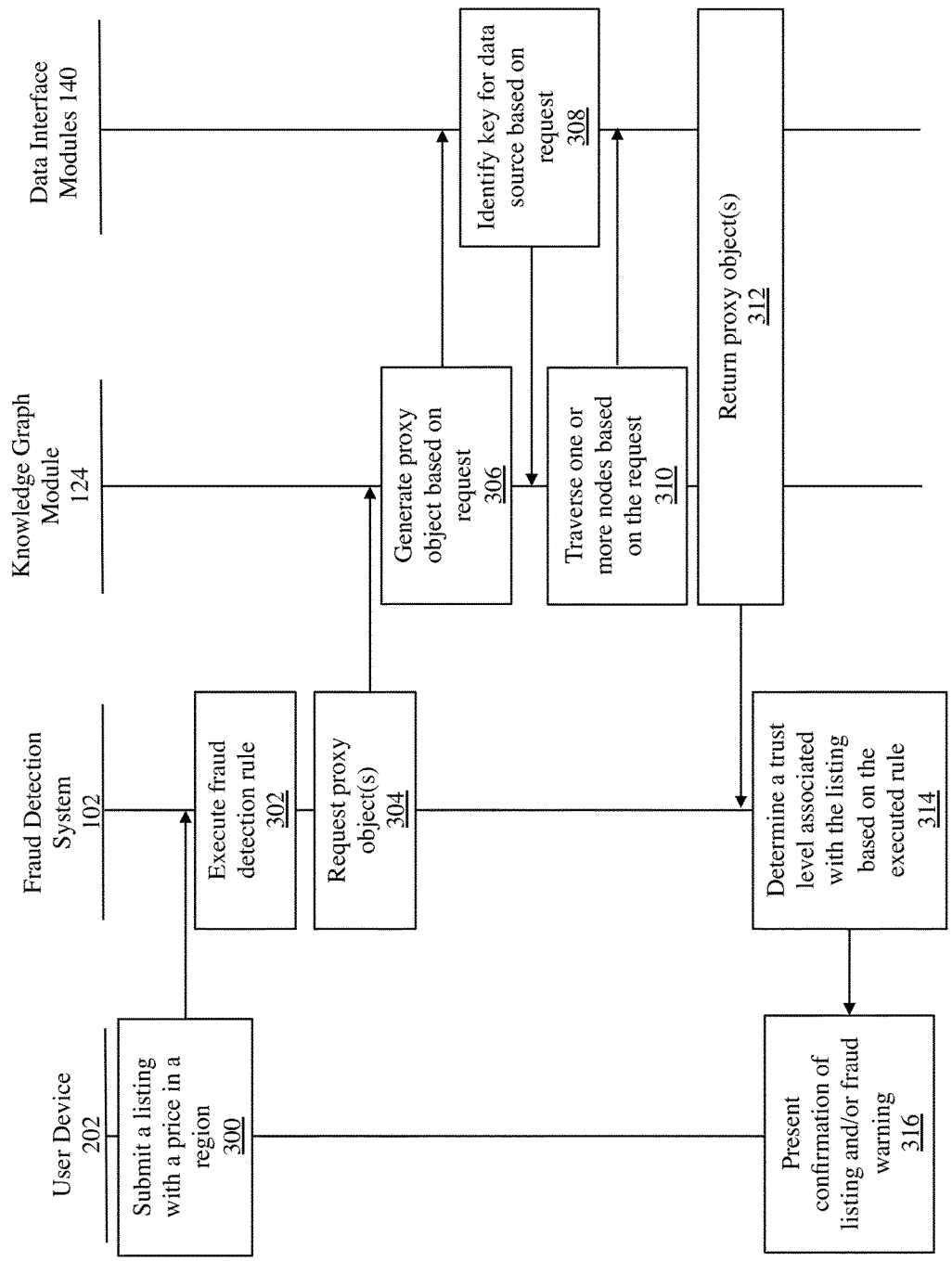
FIG. 3 is an interaction flow diagram illustrating a process for enabling access to data stored in different systems through an abstraction layer in a listing management system, according to an embodiment.

FIG. 3 is an interaction flow diagram illustrating a process for enabling access to data stored in different systems through an abstraction layer in a listing management system, according to an embodiment. FIG. 3 illustrates how a user device 202 may submit a listing with a price in a region 300 that is intercepted by a fraud detection system 102 of the listing management system 100. In one embodiment, the fraud detection system 102 executes a fraud detection rule 302 based on the submitted listing. In another embodiment, one or more criteria may trigger the fraud detection system 102 to execute the fraud detection rule 302. As part of executing the fraud detection rule, in one embodiment, the fraud detection system 102 may request one or more proxy objects 304 from the knowledge graph module 124. For example, a proxy listing object 104, as illustrated in FIG. 1, may be requested 304 based on executing 302 the fraud detection rule 136.

Upon receiving the request for proxy object(s) 304, the knowledge graph module 124 may generate a proxy object based on the request 306. By generating the proxy object, one or more data interface modules 140 may be accessed, or otherwise invoked, by the knowledge graph module 124. The data interface modules 140 enable the knowledge graph module 124 to access several disparate data sources. A key for a data source may be identified 308 based on the request for proxy object(s). In one embodiment, a key may be identified 308 for each data source being accessed by the data interface modules 140. A key may be a unique key, defined as a column or a set of columns in a structured data source. In one embodiment, a key may be identified 308 for an unstructured data source by a data interface module 140.

After a key is identified 308 for each data source based on the request, the knowledge graph module 124 may receive the identified key for each data source and then traverse one or more nodes based on the request 310. The knowledge graph module 124 may traverse one or more nodes 310 using information gathered about the relationships between the data items stored in the disparate data sources based on the identified keys for the data sources. By traversing the one or more nodes 310, the knowledge graph module 124 may "hop" from one data source to another data source through the identified key defining the relationship between the two data sources through the one or more data interface modules 140. In this way, the key facilitates the hopping by identifying nodes including a specific price, region and/or listing data. Based on the proxy object request, the proxy object(s) are constructed by the knowledge graph module 124 and the data interface modules 140 and returned 312 to the fraud detection system 102.

Based on the returned proxy object(s), a trust level associated with the listing may be determined 314 based on the executed rule. Various calculations on data items may be performed based on the returned proxy object(s) through the request for the proxy object(s). For example, as mentioned above, various statistical computations may be performed through the data retrieved and constructed within the returned proxy objects. The trust level may be determined based on a threshold for the one or more computations, such as a standard deviation, average, statistical models, and the like. The determined trust level is then used to present confirmation of the listing and/or a fraud warning 316 at the user device 202. This confirmation of the listing and/or fraud warning 316 is an example output of the system 100 based on the functions described herein. For example, if the trust level of the associated listing is determined to be below a predetermined threshold, the listing may be deemed to be fraudulent. As a result, a fraud warning may be presented 316 at the user device 202.

Figure 4:
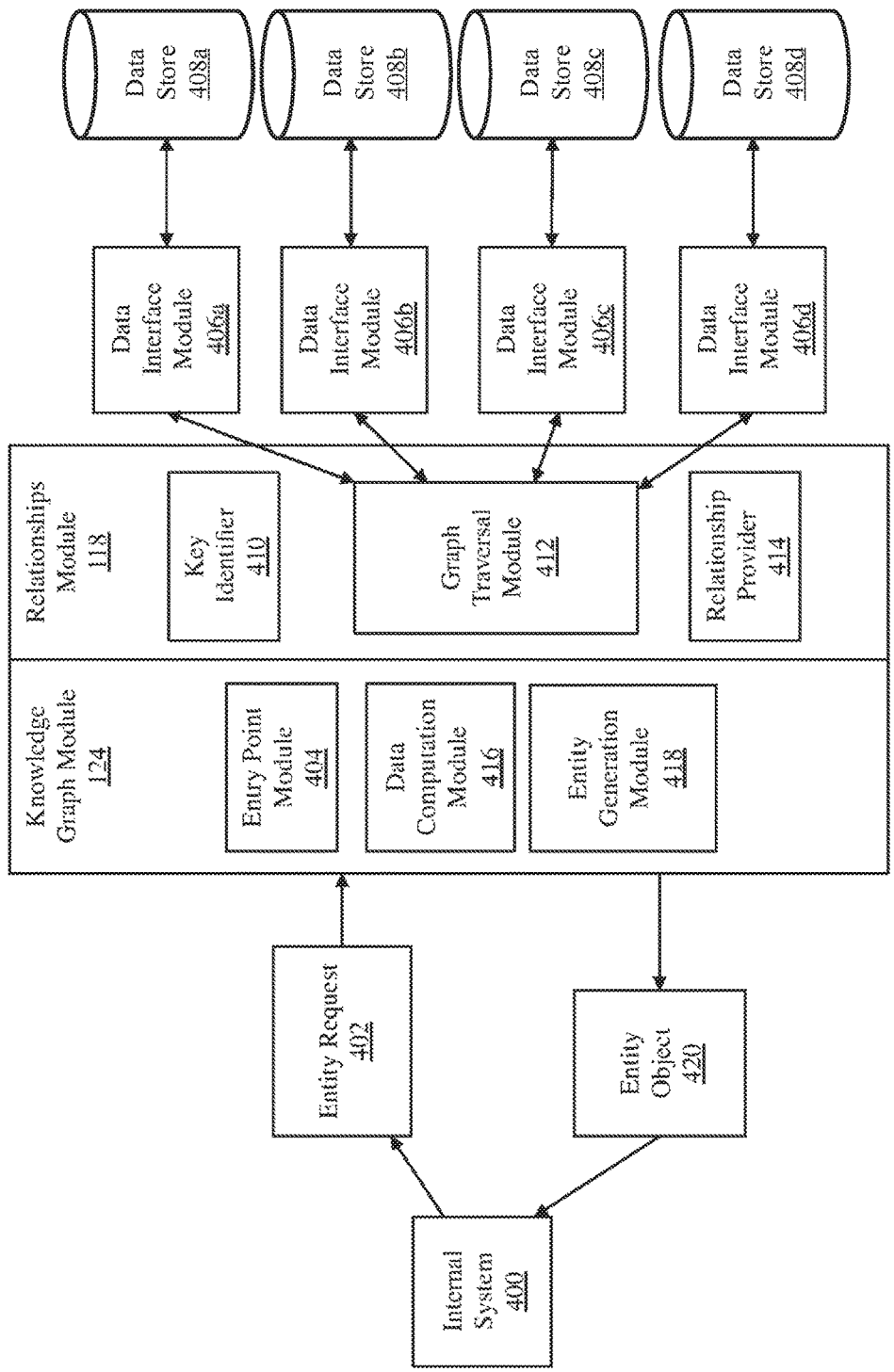
FIG. 4 is a high-level block diagram illustrating a process for enabling an internal system to request data through related nodes modeled as a graph in a listing management system, according to an embodiment.

FIG. 4 is a high-level block diagram illustrating a process for enabling an internal system to request data through related nodes modeled as a graph in a listing management system, according to an embodiment. An internal system 400, such as a fraud detection system or any other module of a listing management system 100, may generate an entity request 402. An entity request 402 may be defined as a data object that invokes a method, such as the knowledge graph module 124, to generate a proxy object. In one embodiment, an entity request 402 may be a JAVA POJO ("plain old Java object"), or an ordinary JAVA object without any restrictions. In another embodiment, the entity request 402 dynamically generates a JAVA class by invoking the knowledge graph module 124.

Once an entity request 402 invokes the knowledge graph module 124, an entry point module 404 determines a configuration of the requested proxy object based on the entity request 402. The configuration of the requested proxy object may include one or more data components, or data items to be retrieved from one or more data stores 408 through one or more data interface modules 406. The entry point module 404, in one embodiment, may determine which functions and/or methods are invoked by the entity request 402. In one embodiment, the entry point module 404 comprises one or more JAVA proxies to dynamically generate JAVA classes to hide the complexity of the functions and/or methods that are invoked by the entity request 402. The knowledge graph module 124 may also include a data computation module 416 and an entity generation module 418. A data computation module 416 may perform statistical computations based on the entity request 402. The entity generation module 418 may construct the entity object 420, or proxy object, that has been requested.

A relationships module 118 may be invoked by the knowledge graph module 124 based on the entity request 402. The relationships module 118 may include a key identifier 410, a graph traversal module 412, and a relationship provider 414. The key identifier 410 may determine a unique key for a data source. Structured data sources, such as relational databases, may have identified keys. Other data sources, such as flat text files and spreadsheets, may be unstructured such that the key identifier 410 may invoke a data interface module 406 to assist in interpreting the data items stored in the data store 408 and identify a key for that data source.

A graph traversal module 412 may traverse a knowledge graph of related nodes, where each node in the graph comprises a data item stored in a data store 408. In some examples, a graph may be a data structure that may be instantiated as an object, stored in memory and referenced by methods or functions in the listing management system 100. The graph traversal module 412 may traverse the graph based on the entity request 402. Returning to a previous example illustrated in FIG. 1, a rule 136 that is evaluated, or executed, generates an entity request 402. The graph traversal module 412 may invoke one or more data interface modules 406 to access data items stored in data stores 408. Data items include data representing a property characteristic, such as a price, region, property description, and the like. For example, the rule 136 may include a code snippet such as "$listing.getPrice( ).getValue( )." The entity request 402 is for a proxy listing object, and the price of the listing may be stored in a separate data source from a listing store. As a result, the graph traversal module 412 may "hop" to a data store 408b that includes the price value data item of the listing associated with the proxy listing object. An identifier of the listing may be included in the entity request 402, in one embodiment. The identifier may comprise a text value, in one embodiment, that uniquely identifies a listing in the listing management system 100. While a listing may, as an object in the listing management system 100, include an identifier, a proxy listing object may have a separate identifier, in one embodiment. The retrieved data items are example output of the system 100 generated by the functions described herein.

A graph traversal module 412 may also traverse the graph of related nodes to gather data items required for a data computation. For example, the rule 136 illustrated in FIG. 1 may include a code snippet that invokes a data computation method. The code snippet portion "$listing.getRegion( ).getAveragePrice( )" may be interpreted by a data computation module 416 as retrieving the prices of all listings in the region associated with the identified listing. As described above, a listing may have several data components, including a price and a region. To compute the average price of the listings included in the region associated with the identified listing in the entity request 402, several data stores 408 may be accessed, such as a price store that includes pricing information for listings and a region store that includes listing identifiers associated with a region.

A relationship provider 414 may determine a relationship between data sources. For example, a price store that includes pricing information may be organized by listing identifiers, such that the listing identifiers are designated as the unique key for the price store. The relationship between the price store and the listing store may be the identified listing associated with the entity request 402. The relationship provider 414 may provide the relationship between the two data sources. As another example, a relationship between a region store and a flat file (e.g., text file) that includes consolidated information from multiple websites operated by the listing management system 100 may be determined by the relationship provider 414. Because a flat file may lack organization and/or structure, a data interface module 406 for that data store 408 may be invoked to assist in identifying a key. Based on the identified key, such as a region identifier, a price range, and/or other data components, the flat file may be related to the region store, which may also be organized by region identifier. As a result, the relationship provider 414 may provide the relationship between those data sources.

The entity generation module 418 may assemble the requested data items from the data stores 408 and construct the entity object 420 configured as detailed in the entity request 402. The entity object 420 may then be made available to the internal system 400. Returning to the previous example illustrated in FIG. 1, the evaluated rule 136 may return a value as retrieved and computed by the knowledge graph module 124, where the entity object 420 may comprise the proxy listing object, or "$listing" as written in the rule 136. By being made available to the internal system 400, the entity object 420 is instantiated as a data structure and arranged in a data repository and/or memory such that the internal system 400 may utilize the assembled data included and/or made accessible by the entity object 420.

Figure 5:
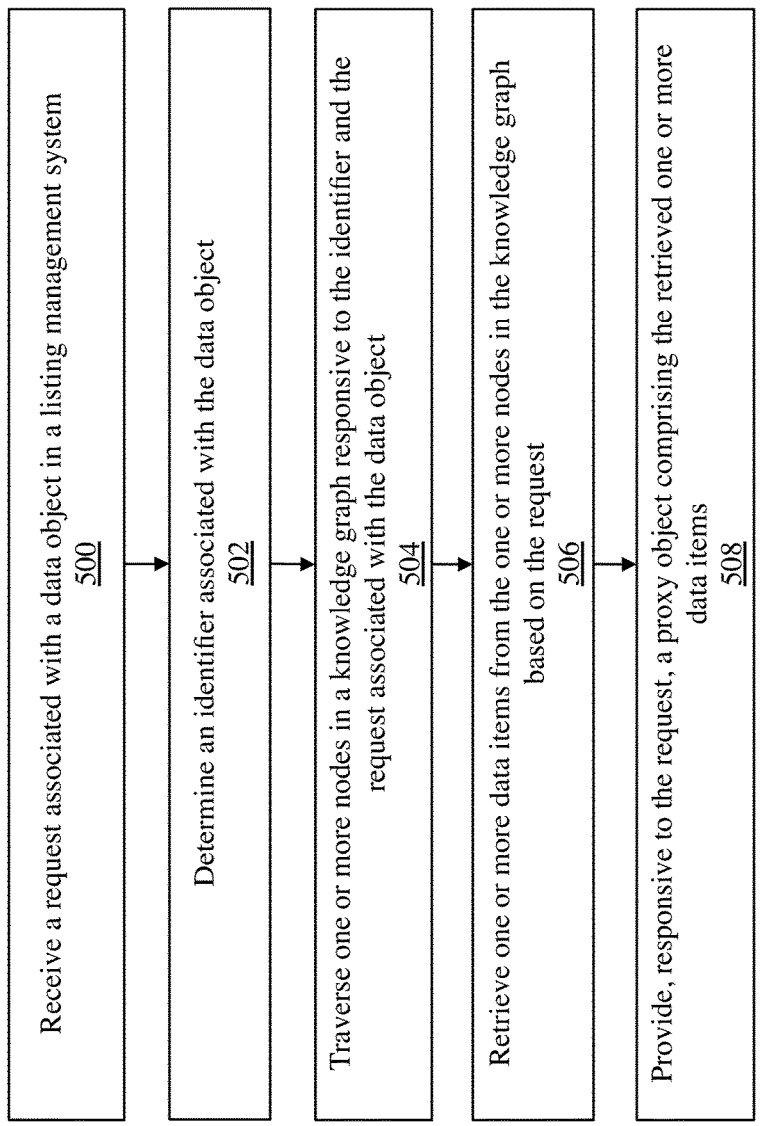
FIG. 5 is a flow chart of a process for accessing data across multiple disparate systems, according to some examples.

FIG. 5 is a flow chart of a process for accessing data across multiple disparate systems, according to some examples. A request associated with a data object in a listing management system is received 500. Such a request may include an evaluation of a fraud rule that includes code snippets that request a proxy object be created in association with a data object in the listing management system 100, such as a listing, region, and/or price. An identifier associated with the data object is determined 502. The identifier may be a unique identifier, such as a listing identifier, a region identifier, and/or a price range identifier. For example, a listing may be classified in a low, medium, or high priced category. As another example, a listing may be categorized into a one-star, two-star, three-star, or four-star level, where each level has a price range. All data objects accessible in the listing management system 100 may have unique identifiers, in one embodiment.

One or more nodes in a knowledge graph may then be traversed 504 responsive to the identifier and the request associated with the data object. The nodes in the knowledge graph may be identified based on a relationships module 118 identifying the relationships between data stores 408. A node may represent data stored in a data store accessible in the listing management system 100, in one embodiment. A knowledge graph may comprise a data structure, such as a proxy object, where related nodes may be accessible through the proxy object. Traversing 504 the knowledge graph through the one or more nodes may be performed by identifying the relationships between the data sources based on the request.

One or more data items may be retrieved 506 from the one or more nodes in the knowledge graph. For example, based on the request, such as an evaluation of a fraud rule, the average price for a region may be retrieved 506. In this example, the prices of listings within an identified region may be retrieved 506 from a price store, or a node in the knowledge graph. The average price for the region may be computed upon retrieval of the prices. A proxy object comprising the retrieved one or more data items may be provided 508 responsive to the request. The proxy object requested may include a listing identifier, the identifier determined 502 for the data object (e.g., the listing) among other data components, in an embodiment.

Figure 6:
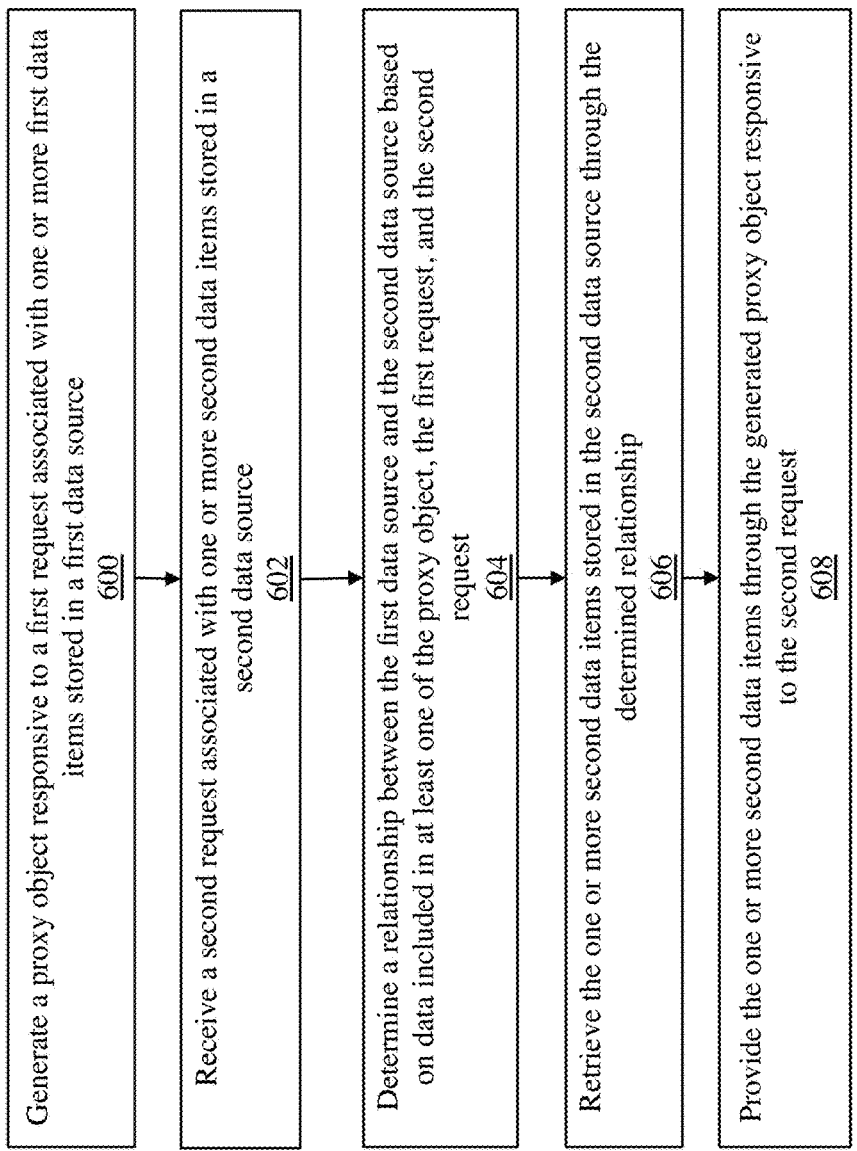
FIG. 6 is a flow chart of a process for enabling entities to request data through related data items stored in separate disparate systems, according to some examples.

FIG. 6 is a flow chart of a process for enabling entities to request data through related data items stored in separate disparate systems, according to some examples. A proxy object may be generated 600 responsive to a first request associated with one or more first data items stored in a first data source. For example, a proxy object may be generated 600 in association with a request for data items about a listing, such as one or more property identifiers for properties associated with the listing, brands associated with the listing, and units associated with the listing. A second request associated with one or more second data items stored in a second data source may then be received 602. For example, the region of the listing may be requested as a second request. In one embodiment, the region of the listing may not be included in a listing store such that the region may be identified through a region store by looking up the listing identifier in the region store. A relationship between the first data source and the second data source may be determined 604 based on data included in at least one of the proxy object, the first request, and the second request. Continuing the example, the relationship between the first data source, the listing store, and the second data source, the region store, may be the listing identifier of the listing associated with the proxy object.

The one or more second data items stored in the second data source may then be retrieved 606 through the determined relationship. In this example, the region associated with the listing may be retrieved 606 as the second data item stored in the region store. The one or more second data items may then be provided 608 through the generated proxy object responsive to the second request. The region may be provided 608 by being made available to a function or method calling for the region to be returned as a data item through the proxy object.

Figure 7:
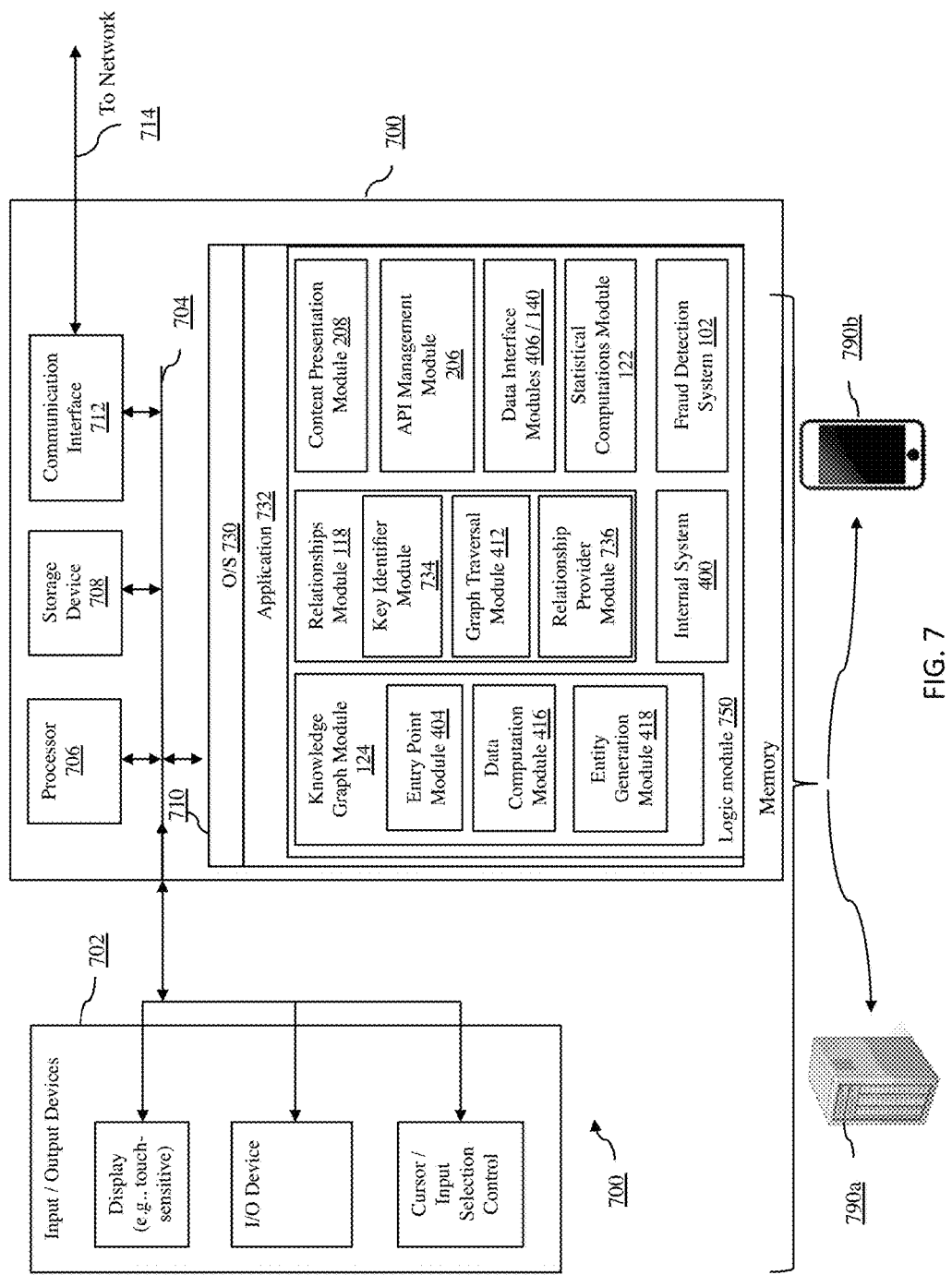
FIG. 7 illustrates an exemplary computing platform disposed in a device configured to provide access to data across disparate systems in accordance with various embodiments.

FIG. 7 illustrates an exemplary computing platform disposed in a device configured to provide access to data across disparate systems in accordance with various embodiments. In some examples, computing platform 700 may be used to implement computer programs, applications, methods, processes, algorithms, or other software to perform the above-described techniques.

In some cases, computing platform can be disposed in wearable device or implement, a mobile computing device 790b, or any other device, such as a computing device 790a.

Computing platform 700 includes a bus 704 or other communication mechanism for communicating information, which interconnects subsystems and devices, such as processor 706, system memory 710 (e.g., RAM, etc.), storage device 708 (e.g., ROM, etc.), a communication interface 712 (e.g., an Ethernet or wireless controller, a Bluetooth controller, etc.) to facilitate communications via a port on communication link 714 to communicate, for example, with a computing device, including mobile computing and/or communication devices with processors. Processor 706 can be implemented with one or more central processing units ("CPUs"), such as those manufactured by Intel® Corporation, or one or more virtual processors, as well as any combination of CPUs and virtual processors. Computing platform 700 exchanges data representing inputs and outputs via input-and-output devices 702, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 700 performs specific operations by processor 706 executing one or more sequences of one or more instructions stored in system memory 710, and computing platform 700 can be implemented in a client-server arrangement, peer-to-peer arrangement, or as any mobile computing device, including smart phones and the like. Such instructions or data may be read into system memory 710 from another computer readable medium, such as storage device 708. In some examples, hard-wired circuitry may be used in place of or in combination with software instructions for implementation. Instructions may be embedded in software or firmware. The term "computer readable medium" refers to any tangible medium that participates in providing instructions to processor 706 for execution. Such a medium may take many forms, including but not limited to, non-volatile media and volatile media. Non-volatile media includes, for example, optical or magnetic disks and the like. Volatile media includes dynamic memory, such as system memory 710.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 704 for transmitting a computer data signal.

In some examples, execution of the sequences of instructions may be performed by computing platform 700. According to some examples, computing platform 700 can be coupled by communication link 714 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 700 may transmit and receive messages, data, and instructions, including program code (e.g., application code) through communication link 714 and communication interface 712. Received program code may be executed by processor 706 as it is received, and/or stored in memory 710 or other non-volatile storage for later execution.

In the example shown, system memory 710 can include various modules that include executable instructions to implement functionalities described herein. System memory 710 may include an operating system ("O/S") 730, as well as an application 732 and/or logic module 750. In the example shown, system memory 710 includes a knowledge graph module 124 including an entry point module 404, a data computation module 416, and an entity generation module 418. The system memory 710 may also include a relationships module 118 that further includes a key identifier module 734, a graph traversal module 412, and a relationship provider module 736. The system memory 710 may further include a content presentation module 208, an API management module 206, data interface modules 406/140, a statistical computations module 122, a fraud detection system 102, and an internal system 400. One or more of the modules included in memory 710 can be configured to provide or consume outputs to implement one or more functions described herein.

In at least some examples, the structures, modules, and/or functions of any of the above-described features can be implemented in software, hardware, firmware, circuitry, or a combination thereof. Note that the structures, modules and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, a listing management system or one or more of its components, or any process or device described herein, can be in communication (e.g., wired or wirelessly) with a mobile device, such as a mobile phone or computing device, or can be disposed therein.

In some cases, a mobile device, or any networked computing device (not shown) in communication with an action alert controller or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a knowledge graph module 124 or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a listing management system, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A system comprising:
a processor configured with computer-executable instructions to:
obtain a request for a proxy code object enabling access to a plurality of data items, each data item stored at a data source of a plurality of disparate data sources, wherein the request includes an identifier for a first data item of the plurality of data items that is stored within a first data source of the plurality of disparate data sources;
retrieve the first data item from the first data source based at least partly on the identifier;
obtain a knowledge graph comprising nodes representing the plurality of data items, the knowledge graph identifying relationships between the plurality of data items stored in the plurality of disparate data sources, wherein each relationship links a characteristic of one data item of the plurality of data items, as stored in one data source of the plurality of disparate data sources, to another data item of the plurality of data items as stored within another data source of the plurality of disparate data sources;
identify, from the knowledge graph, a remainder of data items within the plurality of data items, wherein identifying the remainder of data items comprises traversing the knowledge graph from a first node associated with the first data item to a set of additional nodes associated with the remainder of data items;
generate the proxy code object, wherein the proxy code object includes the first data item and at least one code segment representing a method invocable to access, within a second data source of the plurality of data sources, a second data item within the remainder of data items; and
respond to the received data request by providing the proxy code object.

2. The system of claim 1, wherein the processor is further configured to identify the first data source based at least partly on the identifier for the first data item included within the data request.

3. The system of claim 1, wherein the processor is further configured to:
detect invocation of the method;
retrieve the second data item from the second data source; and
return the second data item.

4. The system of claim 1, wherein the processor is further configured to identify at least one of the relationships based at least partly on one or more annotations.

5. The system of claim 1, wherein the processor is further configured to identify at least one of the relationships based at least partly on at least one object relational mapping.

6. The system of claim 1, wherein the processor is further configured to identify at least one of the relationships based at least partly on at least one SPRING JAVA configuration.

7. The system of claim 1, wherein the method calls a JAVA class comprising code that enables access to the second data source.

8. A computer-implemented method comprising:
obtaining a request for a proxy code object enabling access to a plurality of data items, each data item stored at a data source of a plurality of disparate data sources, wherein the request includes an identifier for a first data item of the plurality of data items that is stored within a first data source of the plurality of disparate data sources;
retrieving the first data item from the first data source based at least partly on the identifier;
obtaining a knowledge graph comprising nodes representing the plurality of data items, the knowledge graph identifying relationships between the plurality of data items stored in the plurality of disparate data sources, wherein each relationship links a characteristic of one data item of the plurality of data items, as stored in one data source of the plurality of disparate data sources, to another data item of the plurality of data items as stored within another data source of the plurality of disparate data sources;
identifying, from the knowledge graph, a remainder of data items within the plurality of data items, wherein identifying the remainder of data items comprises traversing the knowledge graph from a first node associated with the first data item to a set of additional nodes associated with the remainder of data items;
generating the proxy code object, wherein the proxy code object includes the first data item and at least one code segment representing a method invocable to access, within a second data source of the plurality of data sources, a second data item within the remainder of data items; and responding to the received data request by providing the proxy code object.

9. The computer-implemented method of claim 8 further comprising determining a portion of the request constituting the identifier, wherein determining the portion of the request constituting the identifier comprises:

determining a key associated with the first data source;
determining a data component of the request representing the key; and
designating the data component as the identifier.

10. The computer-implemented method of claim 8, wherein traversing the knowledge graph from the first node associated with the first data item to the set of additional nodes associated with the remainder of data items comprises determining, from the knowledge graph, a relationship between the first data item and the second data item, wherein the relationship between the first data item and the second data item indicates that a characteristic the first data item represents a key associated with the second data source.

11. The computer-implemented method of claim 10, wherein traversing the knowledge graph from the first node associated with the first data item to the set of additional nodes associated with the remainder of data items further comprises determining, from the knowledge graph, a relationship between the second data item and a third data item, wherein the relationship between the second data item and the third data item indicates that a characteristic the second data item represents a key associated with a third data source, of the plurality of disparate data sources, at which the third data item is stored.

12. The computer-implemented method of claim 8, wherein at least one relationship of the knowledge graph is identified based at least partly on a combination of an annotation and a SPRING JAVA configuration.

13. The computer-implemented method of claim 8 further comprising:

detecting invocation of the method;
retrieving the second data item from the second data source; and
returning the second data item.

14. The computer-implemented method of claim 13 further comprising returning a computation associated with second data item.

15. Non-transitory computer-readable media comprising instructions that, when executed by a computing system, cause the computing system to:

obtain a request for a proxy code object enabling access to a plurality of data items, each data item stored at a data source of a plurality of disparate data sources, wherein the request includes an identifier for a first data item of the plurality of data items that is stored within a first data source of the plurality of disparate data sources;
retrieve the first data item from the first data source based at least partly on the identifier;
obtain a knowledge graph comprising nodes representing the plurality of data items, the knowledge graph identifying relationships between the plurality of data items stored in the plurality of disparate data sources, wherein each relationship links a characteristic of one data item of the plurality of data items, as stored in one data source of the plurality of disparate data sources, to another data item of the plurality of data items as stored within another data source of the plurality of disparate data sources;
identify, from the knowledge graph, a remainder of data items within the plurality of data items, wherein identifying the remainder of data items comprises traversing the knowledge graph from a first node associated with the first data item to a set of additional nodes associated with the remainder of data items;
generate the proxy code object, wherein the proxy code object includes the first data item and at least one code segment representing a method invocable to access, within a second data source of the plurality of data sources, a second data item within the remainder of data items; and
respond to the received data request by providing the proxy code object.

16. The non-transitory computer-implemented media of claim 15, wherein the instructions are further executable by the computing system to determine the identifier within the request, and wherein, to determine the identifier within the request, the instructions cause the computing system to:

determining a key associated with the first data source;
determining a data component of the request representing the key; and
designating the data component as the identifier.

17. The non-transitory computer-implemented media of claim 15, wherein, to traverse the knowledge graph from the first node associated with the first data item to the set of additional nodes associated with the remainder of data items, the instructions cause the computing system to determine, from the knowledge graph, a relationship between the first data item and the second data item, wherein the relationship between the first data item and the second data item indicates that a characteristic the first data item represents a key associated with the second data source.

18. The non-transitory computer-implemented media of claim 16, wherein, to traverse the knowledge graph from the first node associated with the first data item to the set of additional nodes associated with the remainder of data items, the instructions further cause the computing system to determine, from the knowledge graph, a relationship between the second data item and a third data item, wherein the relationship between the second data item and the third data item indicates that a characteristic the second data item represents a key associated with a third data source, of the plurality of disparate data sources, at which the third data item is stored.

19. The non-transitory computer-implemented media of claim 18, wherein the instructions are further executable by the computing system to:

detect invocation of the method;
retrieve the second data item from the second data source; and
return the second data item.

* * * * *

UNITED STATES PATENT AND TRADEMARK OFFICE
CERTIFICATE OF CORRECTION

Page 1 of 1

PATENT NO. : 10,062,128 B2
APPLICATION NO. : 15/043449
DATED : August 28, 2018
INVENTOR(S) : Bryon Kristen Jacob It is certified that error appears in the above-identified patent and that said Letters Patent is hereby corrected as shown below:

On the Title Page

Item (74), Attorney, Agent, or Firm, Line 1, change "Olsen" to --Olson--.

In the Specification

Column 14, Line 46, change "Blue Tooth®," to --BlueTooth®,--.

In the Claims

Column 20 at Line 22, In Claim 16, change "computer-implemented" to --computer-readable--.

Column 20 at Line 31, In Claim 17, change "computer-implemented" to --computer-readable--.

Column 20 at Line 41, In Claim 18, change "computer-implemented" to --computer-readable--.

Column 20 at Line 53, In Claim 19, change "computer-implemented" to --computer-readable--.

Signed and Sealed this
Fourth Day of December, 2018

Andrei Iancu
*Director of the United States Patent and Trademark Office*